__United States Patent__ [19]

Brown et al.

[11] 4,318,589

[45] Mar. 9, 1982

[54] SEGMENTED CURVED SCREEN CONSTRUCTION FOR PRESERVING A PREDEFINED CURVATURE

[75] Inventors: William C. Brown, Binghamton; Frederick H. Purtell, Endwell, both of N.Y.

[73] Assignee: The Singer Company, Binghamton, N.Y.

[21] Appl. No.: 166,871

[22] Filed: Jul. 7, 1980

[51] Int. Cl.³ .............................................. G03B 21/56
[52] U.S. Cl. ................................................... 350/125
[58] Field of Search ................ 350/117, 125; 156/258; 51/368

[56] References Cited

U.S. PATENT DOCUMENTS

| | | | |
|---|---|---|---|
| 3,295,910 | 1/1967 | Hourdiaux | 350/125 |
| 3,348,897 | 10/1967 | Hourdiaux | 350/125 |
| 3,384,432 | 5/1968 | Hourdiaux | 350/125 |
| 4,057,323 | 11/1977 | Ward, Jr. | 350/125 |
| 4,155,625 | 5/1979 | Schudel | 350/125 |

Primary Examiner—Richard A. Wintercorn
Attorney, Agent, or Firm—Jeff Rothenberg; Stephen C. Kaufman

[57] ABSTRACT

A segmented curved screen (10) for preserving a predefined curvature of the screen surface for an image projection system. A screen segment (12) having a curved surface (14) with a lip having a front surface of predetermined configuration extending along the edge of the surface (16) is connected with a plurality of similar screen segments, (18) to form a segmented curved screen. An extended element (24) with curved surfaces (30, 32) having configurations corresponding to the configurations of associated lip front surfaces is positioned in a mating relationship with the screen segments, in order to secure the screen segments together. The segmented curved screen is so assembled that an exposed channel (38) is formed between any two screen segments. A substance (40) fills the exposed channel, providing a continuous transition surface between screen segments.

17 Claims, 4 Drawing Figures

SEGMENTED CURVED SCREEN CONSTRUCTION FOR PRESERVING A PREDEFINED CURVATURE

The Government has rights in this invention pursuant to Contract No. F33657-78-C-0592 awarded by the Department of the Air Force.

TECHNICAL FIELD

The present invention relates to screens for image projection, and more particularly relates to a segmented screen structure and a method of constructing same, so that a predefined curvature of the screen is preserved.

BACKGROUND ART

Screens for exhibiting projected images typically comprise a substrate or support structure plus some overlaying coating which comprises a screen surface. The present invention is directed to problems associated with the screen substrate or support structure; for the rest of the present application, unless otherwise noted, the screen is defined as the structure minus the surface coating. It is understood that any one of many surface coatings, well known in the art, can be employed with the screen structure of the present invention.

Screens for exhibiting projected images have been provided with curvatures in their horizontal and vertical directions. When the dimensions of the surface of the screen are small, the structure which supports the screen surface can provide rigidity without becoming unwieldly.

Situations exist, however, where it is necessary to employ large screens.

One area that requires large screens is the field of flight simulation. Flight simulation is the generalized term given to the situation where pilots are given on-the-ground training in how to fly aircraft.

Typically, the flight simulator pilot is seated in the middle of a large, geodesic dome structure. An image projection system is used to present a highly realistic visual background environment for the flight simulator pilot. The screen for the image projection system is the interior surface of the geodesic dome. A typical arrangement will employ image projection screens having curvatures of approximately 230" radius.

To make such large screens, two basic interdependent problems must be identified and simultaneously solved.

The first basic problem concerns structure. The structure provides the background support and rigidity for the screen surface. A large screen must have support structure of sufficient integrity and rigidity so that it does not collapse upon itself. Essentially, all the rectilinear forces of the screen support structure must be balanced.

One approach that can be utilized in order to provide structural strength and integrity for a large screen consists in connecting together curvilinear screen segments. Curvilinear screen segments are similar curvilinear units or building blocks which are connected together to build up a larger curvilinear screen.

However, the process of segmenting a large screen introduces an auxiliary problem. The auxiliary problem resides in the necessity of balancing all of the torques that are introduced by connecting together curvilinear segments into a curvilinear screen structure. If the torques are not balanced, the structure will collapse upon itself. Also, unbalanced torques will usually result in warpage and buckling between screen segments.

In summary, the first basic problem in making a large segmented curvilinear screen consists in balancing and resolving the structural rectilinear forces and torques.

The second basic problem in making a large, segmented curvilinear screen concerns curvature. For effective image projection, a screen surface must be continuous and smooth.

A large, segmented curvilinear screen cannot have discontinuities of curvature. Discontinuities of curvature will arise from undulations, warpage or irregularites on the screen surface. Discontinuities which look like seams also arise along the line of intersection of two screen segments.

Discontinuity of curvature will result in non-effective image projection. An example which illustrates the adverse effects of discontinuity of curvature is provided by the image projection system described above in conjunction with flight simulation.

If there is a discontinuity of curvature, a flight simulator pilot will initially assume that undulations on the screen surface are "clouds." When motion is introduced into the visual system, the pilot will observe that the "clouds" move with him, instead of receding into the background. The pilot will be mislead due to discontinuity of curvature.

In order to minimize the discontinuity of curvature problem, it has been found that the viewing surface of the projection screen of a flight simulator should show deviations in curvature less than 0.010 in/1 inch.

The first basic problem (structural forces and torques) and the second basic problem (curvature) are interdependent problems in large screen construction.

Successful large screen construction comprehends the interdependent problem from the outset, and from this vantage point, provides a solution that simultaneously address the problems of structure and curvature.

The prior art is not fully cognizant of the implications of the interdependent problem. Thus, one can observe a tendency in the prior art to first satisfy the difficult problems of balancing rectilinear and torque forces without due consideration for the curvature problem. In the prior art, one method presented is that of building a large structure, and then trying to "fine-tune" the curvature by locally forcing one segment to conform to its neighbor. The problem with this is that once the "fine-tune" adjustments are made over a small area of segments, the large structural rectilinear and torque forces are thrown out of balance. Thus, the entire process of "fine-tuning" must begin anew. A never ending vicious cycle is thus presented.

The Hourdiaux U.S. Pat. No. 3,348,897 illustrates the case where "fine-tuning" of curvature is attempted. Hourdiaux describes a screen built of panels which are assembled and clamped against each other. A curvature control device for "fine-tuning" the curvature is provided. This device comprises an intricate set of connecting rods which have opposite screw-threaded portions engaging internal opposite threadings of a common adjusting nut.

In the process of setting each clamp, structural rectilinear forces and torques are set into play. Hourdiauz does not show how the large screen is built up so that the structural forces and torques are balanced with the clamp curvature torques. A failure to balance these torques will give rise to either structural instability or discontinuity of curvature.

It is also unclear from the Hourdiaux design if the system allows for fine-tuning the curvature in the range 0.010 in/1 inch deviation as required for high quality image projection.

Besides the two basic interdependent problems of structure and curvature, additional problems must also be identified and solved in large segmented screen construction.

Large segmented screens must be easily and inexpensively assembled and disassembled for transport. In addition, the assembled screen should require a minimum of screen surface rework to insure smoothness and continuity.

Further, the image projection system of a flight simulator may be subjected to large motion forces. This acts to jostle the screen segments and the connections between screen segments. The result is that the continuity of curvature may not be maintained. Hence, the structure must be designed so that large motion forces are dissipated and the curvature of the screen viewing system is preserved.

Large screens may take a variety of geometric shapes and sizes. In the area of flight simulation, it is contemplated that a large geodesic dome be one such overall shape. Geodesic domes approach a spheriod shape. Other common practical shapes are ellipsoid, parabolic and hyperboilc. It follows that individual screen segments can have conic section or hyberbolic shapes.

Regardless of the particular chosen size or shape, it is necessary to have one method of construction that can be employed to make a large, segmented curvilinear screen.

The present invention successfully overcomes the shortcomings associated with the prior art. Moreover, it addresses and solves the additional problems present in large, curvilinear screen construction. With the apparatus of the present invention, structural forces and torques are balanced so that the screen has structural stability and the screen surface has a smooth, continuous curvature. The structure is provided with sufficient rigidity and resiliency to absorb motion forces. Moreover, the structure may be easily assembled and disassembled. Finally, a method of construction of the present invention allows diverse geometric screen segments to be utilized in building up a large, segmented curvilinear screen.

DISCLOSURE OF THE INVENTION

Accordingly, a primary object of the present invention is to provide a large, segmented curvilinear screen, which preserves a predefined curvature of the screen.

It is a further object of the present invention to present a method for construction of a large, segmented curvilinear screen.

These and other objects are accomplished by providing a first screen segment having a first curved surface. The first segment has a first lip having a first lip surface of predetermined configuration; the first lip extends along an edge of the first curved surface.

Also provided is a second screen segment having a second curved surface. The second segment has a second lip having a second lip surface of predetermined configuration; the second lip extends along an edge of the second curved surface.

An extended element acts to connect the first screen segment to the second screen segment along the above-mentioned edges. The extended element has a third curved surface. This third curved surface has a configuration corresponding to the predetermined configuration of the first lip surface. The third curved surface is positioned in a mating relationship with the first lip surface. The extended element also has a fourth curved surface. This fourth curved surface has a configuration corresponding to the predetermined configuration of the second lip surface. The fourth curved surface is positioned in a mating relationship with the second lip surface.

The first lip surface is connected with the third curved surface of the extended element. The second lip surface is connected with the fourth curved surface of the extended element. The connections are so made that an exposed channel is formed between the first and second screen segments.

The exposed channel is filled with a substance that provides a continuous transition surface between the first and second curved screen surfaces.

According to the present invention, the extended element acts to provide structural integrity and resolve all rectilinear forces. Since the configurations of the extended element surfaces correspond to the configurations of the associated lip surfaces of predetermined configuration extending along the edge of the associated screen segment surfaces, the curvature of these mating surfaces also correspond. This arrangement resolves all the curvilinear torques at the same time as it preserves the continuity of curvature from a first screen segment to a second screen segment.

A transition area in the form of an exposed channel is created between any two screen segments. After filling and smoothing the exposed channel, all of the connections are hidden from the viewer's line of sight. The result is one continuously smooth screen surface which preserves a predefined curvature of the screen.

BRIEF DESCRIPTION OF DRAWINGS

These and other features of the present invention will be more clearly understood from a consideration of the following description taken in connection with the accompanying drawings in which.

BEST MODE FOR CARRYING OUT THE INVENTION

Figure 1:
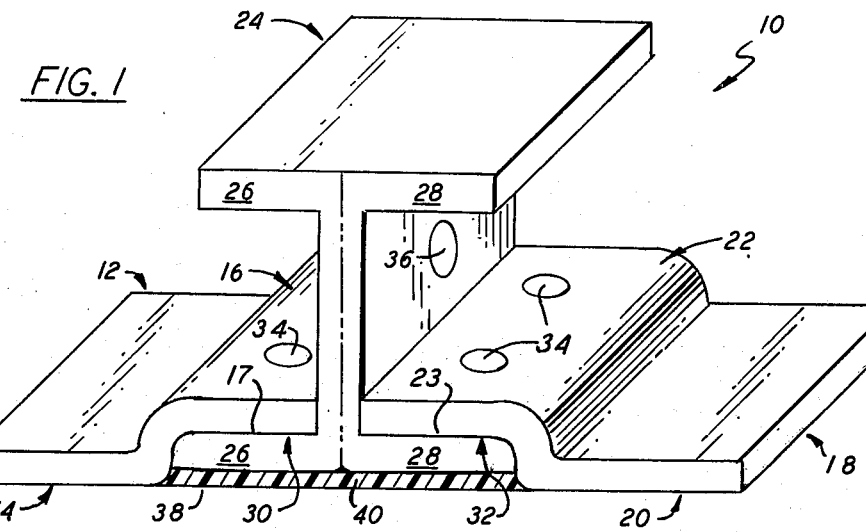
FIG. 1 is an isometric view of the preferred embodiment of the segmented curved screen.

The preferred construction of the segmented curved screen 10 of the present invention is shown in FIG. 1. Illustrated are three basic elements—two screen segments 12, 18 connected together by an extended element 24.

In particular, numerals 12 and 18 indicate a first and second screen segment respectively. First screen segment 12 has an associated first curved surface 14. Extending along an edge of the first screen segment surface and recessed therefrom, is a first lip 16 having a first front surface 17 of predetermined configuration. Second screen segment 18 also has an associated second curved surface 20. Extending along an edge of second curved surface 20 and recessed therefrom, is a second lip 22 having a second front surface 23 of predetermined configuration. The predetermined configurations of the front surfaces 17 and 23 may be defined in gross terms by cross sectional views in a series of parallel planes extending perpendicularly to a given axis. In the preferred construction, the front surfaces 17 and 23 are the same and the cross sectional views comprise simple curves. More complex textures of the front surfaces, like convolutions and flutations of the surface, are secondary design configurations.

In practice, different modes of construction vary the size of the lips 16 and 22. The criteria for the size of the lips is based on the connection arrangement between the lips and the extended element 24.

The extended element is provided with a third curved surface 30 and a fourth curved surface 32. The third curved surface is provided with a configuration that corresponds to front surface 17 of lip 16. The fourth curved surface is provided with a configuration that corresponds to front surface 23 of lip 22.

The two screen segments are connected together by the extended element in the following manner. The third curved surface of the extended element is positioned in a mating relationship with the first front surface 17 and connected thereto at 34. Similarly, the fourth curved surface of the extended element is positioned in a mating relationship with the second front surface 23 and connected thereto at 34. The connections may be made by, for example, pop rivets, which pass from the extended member into the front surfaces.

According to this arrangement, an exposed channel 38 is formed. The exposed channel is defined by the edge length of screen segments 12 and 18, the separation between first curved surface 14 and second curved surface 20 and in depth by the distance from the first and second curved surfaces 14 and 20 to the extended element.

A substance 40 is used to fill the exposed channel. This provides a continuous transition surface between the first and second screen surfaces. The substance may comprise a body filler. WHITE LIGHTNING polyester putty, a trademarked body filler available from the Marson Corporation of Chelsea, MA, is a suitable body filler.

After the body filler is inserted in the exposed channel, the transition surface may be sanded and lapped by a lapping block, in the general manner, as taught by Dotsko, U.S. Pat. No. 4,206,574. In this manner, the curvature of the transition surface can be made to show deviations in curvatures less than 0.010 inch/1 inch.

It is preferred that the first and second screen segments and extended element by made of thermal plastic material. High density fiberglass is a particularly good material. The high density fiberglass material comprises superimposed layers of alternate sheets of fiberglass material and resin. For this purpose, FIBERGLASS, available from Owens-Corning Fiberglass Corporation of Anderson, S.C. and HETRON polyester resin, a trademarked resin available from Hooker Chemical Corporation of North Tonawanda, N.Y., are suitable products.

The use of high density fiberglass is found to be advantageous in several ways. First, it provides a lightweight, resilient structure for support of the screen surface. Second, the layup process of making the high density fiberglass structures (superimposed layers of alternate sheets of fiberglass and resin) can be employed in a versatile manner to construct different embodiments of the present invention.

A first different embodiment, for example, concerns the extended element 24. The extended element, heretofore described, is unibody or one continuous structure. It has been found that, for ease of shipment and assembly and disassembly, a unibody extended element may be cumbersome and awkward to manipulate in the process of building large screens. Hence, in the first embodiment, the fiberglass extended element is initially subdivided into parts 26 and 28 and then joined together, for example, by a mechanical fastener 36. The subdivided parts that comprise the extended element are easier to handle in building up the large screen than the unibody extended element.

Figure 2:
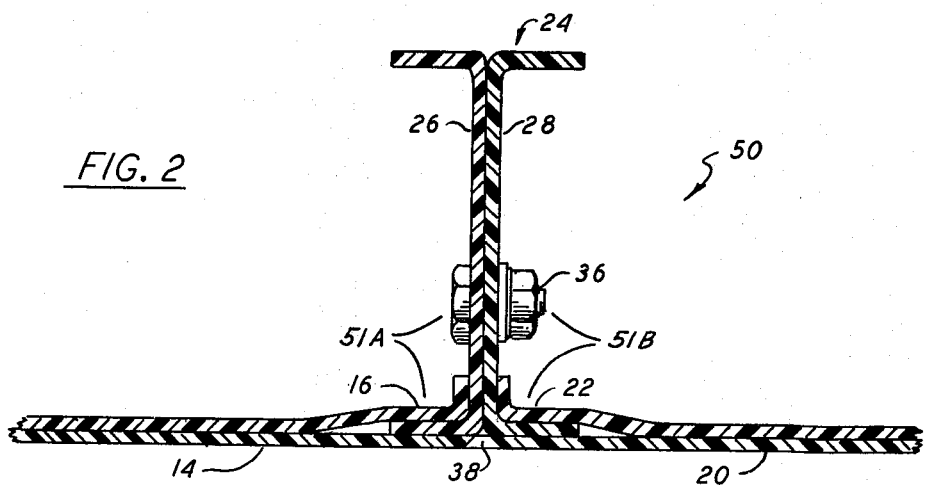
FIG. 2 is a section view showing an alternative embodiment.

A second different embodiment of the present invention employs fiberglass layup techniques in order to reduce the size of the dimensions of the exposed channel 38. FIG. 2, indicated by reference numeral 50, shows the reduced dimensions of the exposed channel. A smaller exposed channel is advantageous because it minimizes the transition surface between the first and second screen segments.

The fiberglass layup technique is employed in the following manner in order to minimize the transition surface. A mold is provided that is contoured in the general shape shown by 51a, 51b. A layup of alternating layers of fiberglass and resin is built up in the mold. The resin bonds different layers of fiberglass together. It is observed that in 51a, the extended element 24 is sandwiched and bonded by the resin between first lip 16 and an extension of first screen segment surface 14. Similarly in 51b, the extended element 24 is sandwiched and bonded by the resin between second lip 22 and an extension of second screen segment surface 20. The bonded sandwiches remove the necessity for a mechanical fastener between the extended member 24 and the lips. (Thus replacing the pop-rivet scheme employed in FIG. 1.)

In another embodiment of the invention (not shown) the extended element can be located totally outside of the recess formed by the lips of adjacent screen segments. In this variation the back faces of the lips are mated to the front surfaces of the extended element. As in all of the embodiments of the invention the mating surfaces of the lips and extended element are provided with corresponding configurations.

For illustration purposes, the assembly of only two screen segments has been shown in FIGS. 1 and 2; however, as will be apparent to those skilled in the art, the principles of the present invention can be extended to the other edges of these segments and to any number of segments so as to permit construction of multiple segment screens of any desired shape and size.

Application of the principles of the present invention can be further extended so that any practical screen surface can be given structural support.

Figure 3:
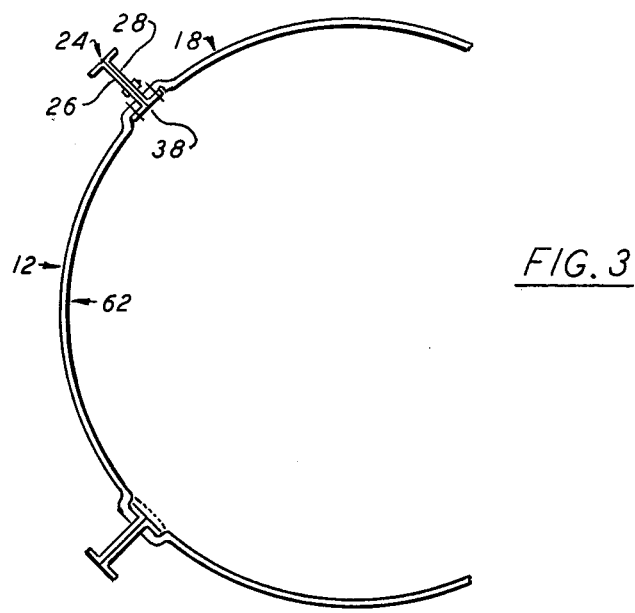
FIG. 3 is a cross sectional view of a spherical screen section constructed according to the principles of the present invention.

A typical employment of the principles of the present invention is shown by FIG. 3. Here, the segmented curve screen 62 is curved generally spherically. Using the techniques of the present invention, a large curved screen can be constructed which will exhibit not only structural stability, but also variations of surface curvature conforming to tolerances of 0.010 in/inch.

The segmented curved screen may, in the general case, assume hyperbolic curvature.

Figure 4:
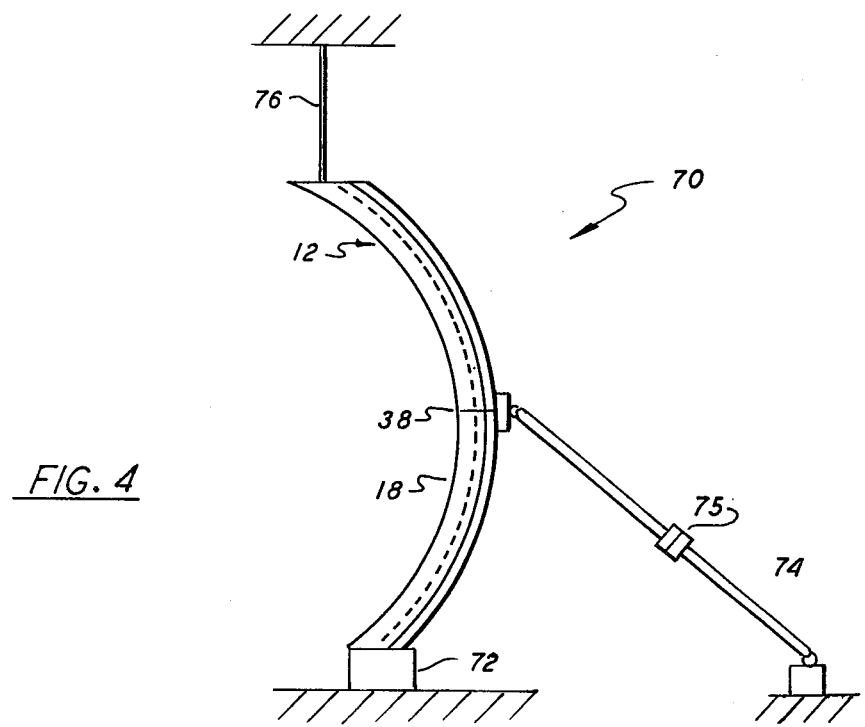
FIG. 4 illustrates a partial screen support approach for one embodiment of the present invention.

FIG. 4 shows another employment of the present invention. Numeral 70 indicates generally an approach for orienting a segmented screen assembly according to the present invention. Two screen segments 12, 18 are connected according to the principles of the present invention. Base support 72, rigid support rods 74, adjustable in length by support member 75, and rigid link to ceiling 76 support the assembled screen segments 12, 18 in a desired generally vertical orientation.

With the apparatus of the present invention, structural forces and torques are balanced so that the screen has structural stability and the screen surface has a continuous curvature. The preferred embodiment illustrates how this is accomplished. The extended elements function to provide structural integrity to the overall screen assembly. Also, the extended element is provided with a configuration and a curvature in correspondence with the configuration and curvature of associated screen segments. This provision allows for preserving continuity of curvature from a first screen segment to a second screen segment.

Although specific embodiments of the invention have been described herein, it will be obvious to those skilled in the art that various modifications may be made without departing from the spirit of the invention. With the foregoing in mind, it is understood that the invention is intended to be limited solely by the appended claims.

We claim:

1. A segmented curved screen for an image projection system which maintains a predefined curvature of the screen, said screen comprising:
   (a) a first screen segment having a first curved surface and a first lip having a first lip surface of predetermined configuration, said lip extending along an edge of said first curved surface;
   (b) a second screen segment having a second curved surface and a second lip having a second lip surface of predetermined configuration; said second lip extending along an edge of said second curved surface;
   (c) an extended element having a third curved surface, said third curved surface having a configuration corresponding to said predetermined configuration of said first lip surface and positioned in a mating relationship with said first lip surface, and a fourth curved surface, said fourth curved surface having a configuration corresponding to the predetermined configuration of said second lip surface and positioned in a mating relationship with said second lip surface;
   (d) joining means to connect said first lip surface with said third curved surface, and said second lip surface with said fourth curved surface, in a manner that forms an exposed channel between said first and second screen segments; and
   (e) a substance filling said exposed channel providing a continuous transition surface between said first and second screen segment surfaces, whereby a screen of predefined curvature is provided.

2. A segmented curved screen as recited in claim 1, wherein said first and second lips each comprise a recessed lip.

3. A segmented curved screen as recited in claim 2, wherein said lip surfaces comprise front surfaces.

4. A segmented curved screen as recited in claim 1, wherein said configurations are substantially the same.

5. A segmented curved screen as recited in claim 1, wherein said configurations are curves.

6. A segmented curved screen as recited in claim 2, wherein said exposed channel is defined by the distance between said first and second screen segment surfaces and in depth by the distance from the first and second curved surfaces to the extended element.

7. A segmented curved screen as recited in claim 1, wherein said segmented curved screen is curved generally spherically.

8. A segmented curved screen as recited in claim 6 wherein curvature across the first curved surface, the transition surface and the second curved surface varies by less than 0.010 inch/inch from the predefined curvature.

9. A segmented curved screen as recited in claim 1, wherein the predefined curvature of the screen is hyperbolic.

10. A segmented curved screen as recited in claim 1, wherein said first and second screen segment and said extended element comprise a thermal plastic material.

11. A segmented curved screen as recited in claim 9, wherein said thermal plastic material is high density fiberglass.

12. A segmented curved screen as recited in claim 10, wherein said high density fiberglass material comprises superimposed layers of sheets of fiberglass material bonded by resin.

13. A segmented curved screen as recited in claim 1, wherein said substance comprises a body filler.

14. A segmented curved screen as recited in claim 1, wherein the extended element is unibody.

15. A segmented curved screen as recited in claim 1, wherein the extended element is subdivided into two parts, joined together by a mechanical fastener.

16. A segmented curved screen as recited in claim 1, wherein the extended element is sandwiched and bonded between a lip and an extension of screen segment surface.

17. A method for constructing a segmented curved screen for an image projection system which maintains a predefined curvature of the screen, comprising the steps of:
   (a) providing a first screen segment having a first curved surface and a first lip having a first lip surface of predetermined configuration, said lip extending along an edge of said first curved surface;
   (b) providing a second screen segment having a second curved surface, and a second lip having a second lip surface of predetermined configuration; said second lip extending along an edge of said second curved surface;
   (c) providing an extended element having a third curved surface, said third curved surface having a configuration corresponding to said predetermined configuration of said first lip surface and positioned in a mating relationship with said first lip surface, and a fourth curved surface, said fourth curved surface having a configuration corresponding to said predetermined configuration of said second lip surface and positioned in a mating relationship with said second lip surface;
   (d) joining said first lip surface with said third curved surface, and said second lip surface with said fourth curved surface, in a manner that forms an exposed channel between said first and second screen segments; and
   (e) filling said exposed channel with a substance providing a continuous transition surface between said first and second screen segment surfaces, whereby a screen of predefined curvature is provided.

* * * * *